US012808755B2

(12) United States Patent
Mutzl et al.

(10) Patent No.: US 12,808,755 B2
(45) Date of Patent: Nov. 24, 2026

(54) FAULT STATE DETECTION APPARATUS

(71) Applicant: ABB Schweiz AG, Baden (CH)

(72) Inventors: Felix Mutzl, Nuremberg (DE); Nilesh Shamji Prajapati, Bangalore (IN); Sebastian Obermeier, Rietheim (CH)

(73) Assignee: ABB Schweiz AG, Baden (CH)

( * ) Notice: Subject to any disclaimer, the term of this patent is extended or adjusted under 35 U.S.C. 154(b) by 478 days.

(21) Appl. No.: 17/968,905

(22) Filed: Oct. 19, 2022

(65) Prior Publication Data

US 2025/0290832 A1 Sep. 18, 2025

Related U.S. Application Data

(63) Continuation of application No. PCT/EP2020/061000, filed on Apr. 20, 2020.

(51) Int. Cl.

*G01M 99/00* (2011.01)
*G05B 23/02* (2006.01)
*G06N 20/00* (2019.01)

(52) U.S. Cl.

CPC ....... *G01M 99/005* (2013.01); *G05B 23/0213* (2013.01); *G05B 23/0254* (2013.01); *G06N 20/00* (2019.01)

(58) Field of Classification Search

None

See application file for complete search history.

(56) References Cited

U.S. PATENT DOCUMENTS 8,510,728 B2 8/2013 Burckart et al.
2016/0132787 A1* 5/2016 Drevo .................... G06N 20/10 706/12

(Continued)

FOREIGN PATENT DOCUMENTS

CN 107153630 A 9/2017
CN 108920259 A * 11/2018 ............ G06F 5/027

(Continued)

OTHER PUBLICATIONS

Scolari et al., "Towards Accelerating Generic Machine Learning Prediction Pipelines," 2017 *IEEE International Conference on Computer Design* (*ICCD*), pp. 431-434 (Nov. 5-8, 2017).

(Continued)

*Primary Examiner* — Matthew G Marini

(74) *Attorney, Agent, or Firm* — Whitmyer IP Group LLC

(57) ABSTRACT

An industrial data monitoring apparatus includes an input unit; a processing unit; and an output unit. The input unit receives industrial monitor data from a plurality of devices. The processing unit accesses a machine learning environment. The processing unit accesses a plurality of trained machine learning models. Each of the plurality of trained machine learning models corresponds to a different device of the plurality of devices, and the plurality of trained machine learning models is separate to the machine learning environment. The apparatus implements the machine learning environment and runs the trained machine learning model for a particular device to analyse the industrial monitor data received from the particular device of the plurality of devices. The output unit outputs an analysis result associated with the analysis of industrial monitor data received from the particular device of the plurality of devices.

7 Claims, 2 Drawing Sheets

(56) References Cited

U.S. PATENT DOCUMENTS

| | | | | |
|---|---|---|---|---|
| 2018/0224808 | A1 | 8/2018 | Tong et al. | |
| 2018/0329935 | A1 | 11/2018 | Mugali et al. | |
| 2019/0155633 | A1* | 5/2019 | Faulhaber, Jr. | .......... G06N 5/04 |
| 2020/0012962 | A1 | 1/2020 | Dent et al. | |

FOREIGN PATENT DOCUMENTS

| | | | | | |
|---|---|---|---|---|---|
| CN | 109581972 | A | | 4/2019 | |
| CN | 110334816 | A | | 10/2019 | |
| CN | 110431503 | A | | 11/2019 | |
| CN | 110520872 | A | | 11/2019 | |
| CN | 110750342 | A | | 2/2020 | |
| CN | 110874652 | A | | 3/2020 | |
| WO | WO-2017116627 | A1 | * | 7/2017 | ........... G05B 19/418 |
| WO | WO 2020/040764 | A1 | | 2/2020 | |
| WO | WO-2020036818 | A1 | * | 2/2020 | ......... G05B 23/0283 |

OTHER PUBLICATIONS

European Patent Office, International Search Report in International Patent Application No. PCT/EP2020/061000, 3 pp. (Jan. 15, 2021).

European Patent Office, Written Opinion in International Patent Application No. PCT/EP2020/061000, 6 pp. (Jan. 15, 2021).

China National Intellectual Property Administration, Office Action in Chinese Patent Application No. 202080099983.2, 8 pp. (Sep. 8, 2025).

* cited by examiner

FAULT STATE DETECTION APPARATUS

CROSS-REFERENCE TO RELATED APPLICATIONS

This patent application claims priority to International Patent Application No. PCT/EP2020/061000, filed on Apr. 20, 2020, which is incorporated herein in its entirety by reference.

FIELD OF THE DISCLOSURE

The present disclosure relates to an industrial data monitoring apparatus, and to a method of industrial data monitoring.

BACKGROUND OF THE INVENTION

When using Machine Learning (ML) and Artificial Intelligence (AI), the typical flow is to use input data to train a so-called "machine learning model". This trained model is then deployed into a live environment and constantly fed with input data. Based on the training, an output is calculated and returned.

When utilizing such Machine Learning solutions for complex industrial systems (e.g. production systems), a common challenge is that devices of the same kind (e.g. robots) perform completely different actions (e.g., an arc welding robot differs from a paint robot) and may be utilized in different climate conditions. This, however, means that the trained ML model of one robot is not directly usable for a different robot. Therefore, the same ML model type needs to be individually trained with the specific input data of a specific robot.

BRIEF SUMMARY OF THE INVENTION

The present disclosure describes an improved technique to monitor industrial data returned from industrial devices.

In a first aspect, there is provided an industrial data monitoring apparatus, comprising:

an input unit;

a processing unit; and an output unit.

The input unit is configured to receive industrial monitor data from a plurality of devices. The processing unit is configured to access a machine learning environment. The processing unit is configured to access a plurality of trained machine learning models. The plurality of trained machine learning models each correspond to a different device of the plurality of devices. The plurality of trained machine learning models are separate to the machine learning environment. Upon receipt of industrial monitor data from a particular device of the plurality of devices, the apparatus is configured to access and implement the machine learning environment and access and run the trained machine learning model for the particular device to analyze the industrial monitor data received from the particular device of the plurality of devices. The output unit is configured to output an analysis result associated with the analysis of industrial monitor data received from the particular device of the plurality of devices.

BRIEF DESCRIPTION OF THE SEVERAL VIEWS OF THE DRAWING(S)

DETAILED DESCRIPTION OF THE INVENTION

Figure 1:
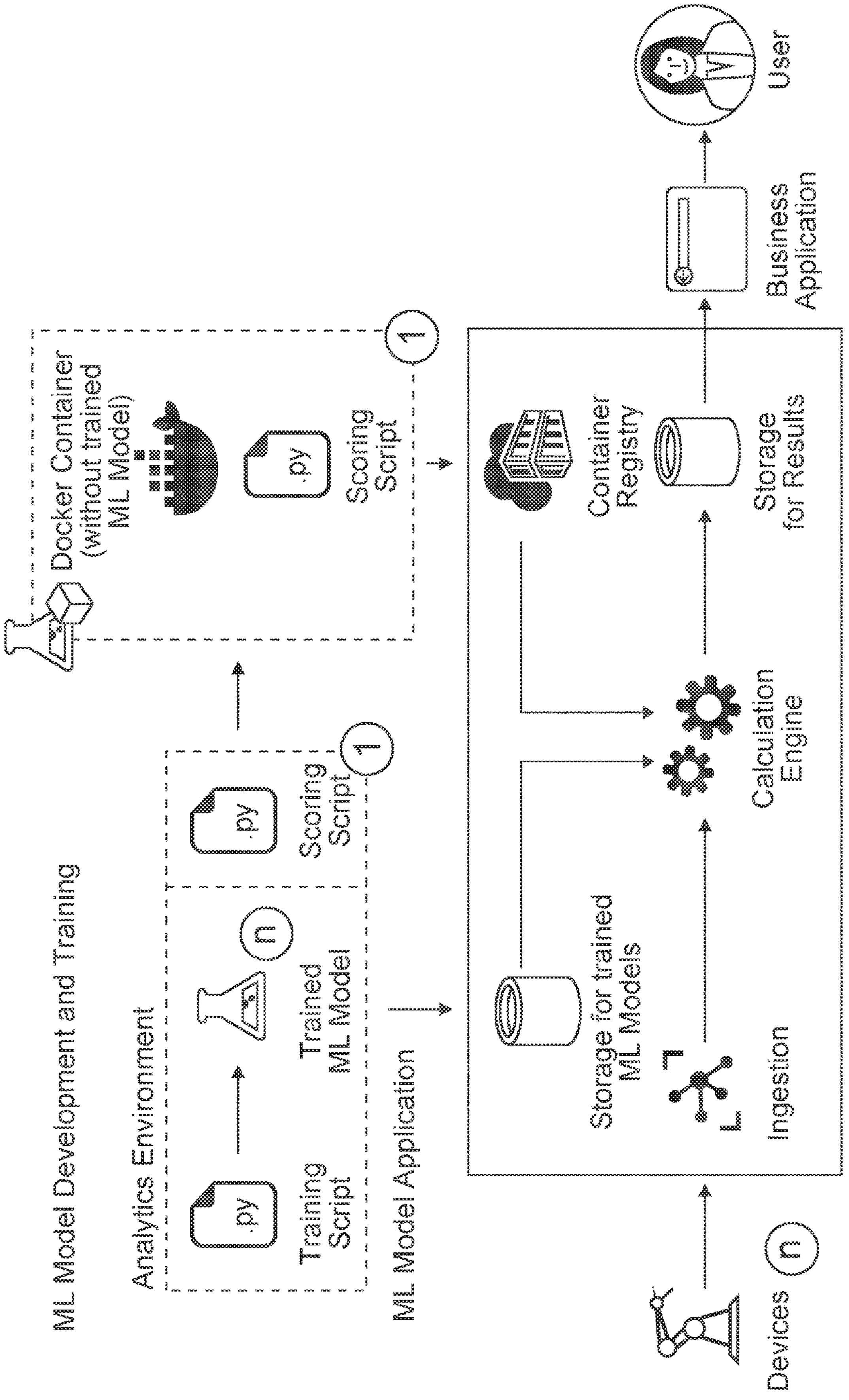
FIG. 1 is a schematic illustration of a detailed example of an industrial data monitoring apparatus in accordance with the disclosure.
Figure 2:
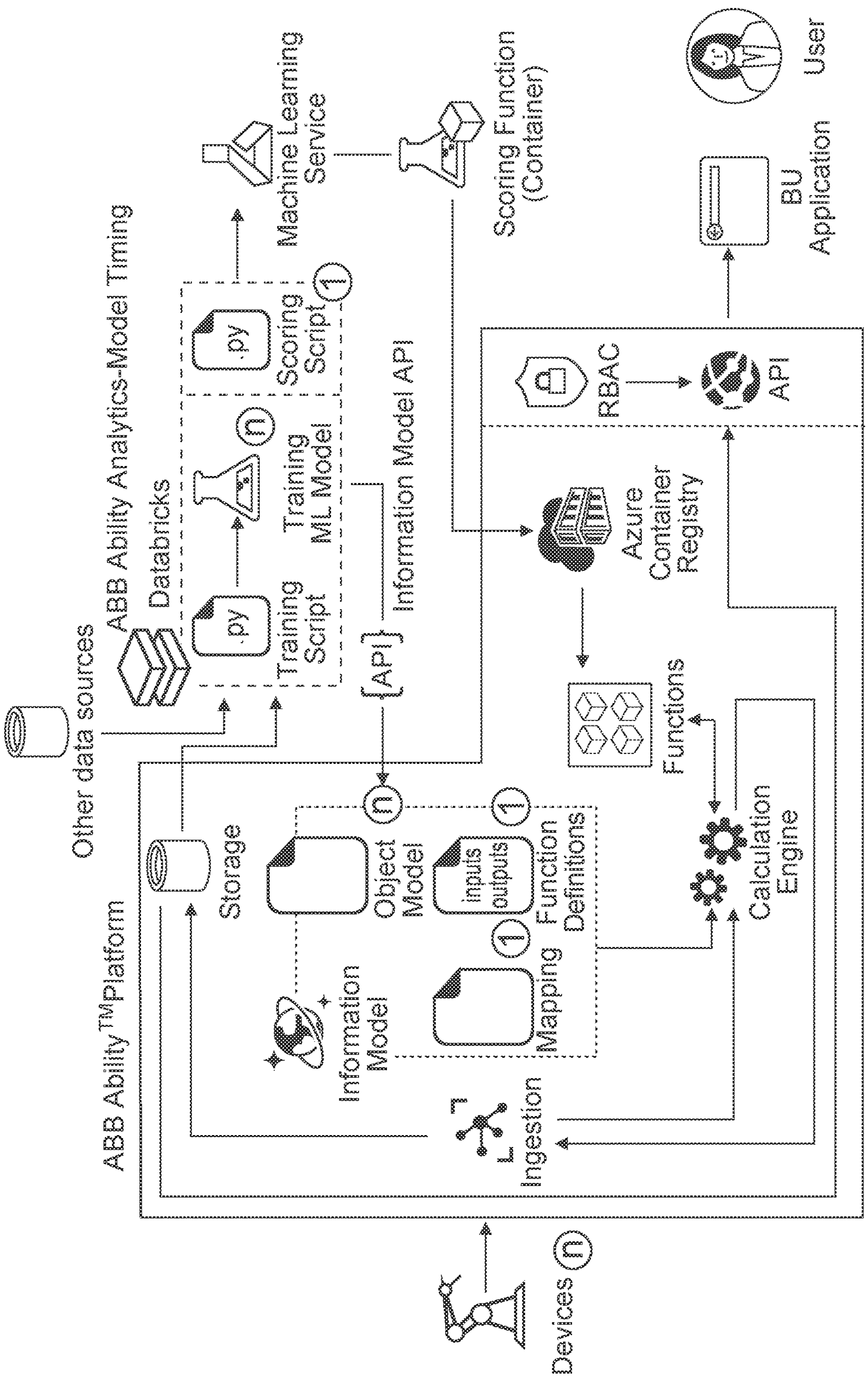
FIG. 2 is a schematic illustration of a detailed example of an industrial data monitoring apparatus in accordance with the disclosure.

FIGS. 1-2 relate to an industrial data monitoring apparatus and a method of industrial data monitoring.

According to an example an industrial data monitoring apparatus comprises an input unit, a processing unit, and an output unit. The input unit is configured to receive industrial monitor data from a plurality of devices. The processing unit is configured to access a machine learning environment. The processing unit is configured to access a plurality of trained machine learning models. The plurality of trained machine learning models each correspond to a different device of the plurality of devices, and the plurality of trained machine learning models are separate to the machine learning environment. Upon receipt of industrial monitor data from a particular device of the plurality of devices, the apparatus is configured to implement the machine learning environment and run the trained machine learning model for the particular device to analyze the industrial monitor data received from the particular device of the plurality of devices. The output unit is configured to output an analysis result associated with the analysis of industrial monitor data received from the particular device of the plurality of devices.

According to an example, the processing unit is configured to access and implement a data score algorithm or function. The data score algorithm or function is configured to process the analysis of the industrial monitor data received from the processing unit for the particular device of the plurality of devices to determine the analysis result.

According to an example, the analysis result comprises a health score of the particular device of the plurality of devices.

According to an example, each device of the plurality of devices has an associated object model, and wherein the trained machine learning model for that device is comprised within the object model for that device.

According to an example, the machine learning environment is located on a data storage of the apparatus.

In an example, the machine learning environment is located on a memory of the apparatus.

According to an example, the plurality of trained machine learning models are located on a data storage of the apparatus.

In an example, the plurality of trained machine learning models are located on a memory of the apparatus.

According to an example, each trained machine learning algorithm was trained on the basis of a plurality of training industrial monitoring data and associated ground truth information.

According to an example, the plurality of training industrial monitoring data and associated ground truth information was for the device or type of device associated with the trained machine learning algorithm.

According to an example, the ground truth information was for the device or type of device associated with the trained machine learning algorithm.

According to an example, the ground truth information associated with the plurality of training industrial monitoring data comprised associated health score information for the device or type of device associated with specific training industrial monitoring data.

It is clear from the above, that FIGS. 1-2 also relate to a method of industrial data monitoring. The method comprises:

receiving by an input unit receive industrial monitor data from a particular device of a plurality of devices;

accessing by a processing unit a machine learning environment;

accessing by the processing unit a trained machine learning model for the particular device from a plurality of trained machine learning algorithms, wherein the plurality of trained machine learning models each correspond to a different device of the plurality of devices, and wherein the plurality of trained machine learning models are separate to the machine learning environment;

implementing by the processing unit the machine learning environment and running the trained machine learning model for the particular device to analyze the industrial monitor data received from the particular device of the plurality of devices; and outputting by an output unit an analysis result associated with the analysis of industrial monitor data received from the particular device of the plurality of devices.

According to an example, the method comprises accessing and implementing by the processing unit a data score algorithm or function, and processing with the data score algorithm or function the analysis of the industrial monitor data received from the processing unit for the particular device of the plurality of devices to determine the analysis result.

According to an example, the analysis result comprises a health score of the particular device of the plurality of devices.

According to an example, each device of the plurality of devices has an associated object model, and the trained machine learning model for that device is comprised within the object model for that device.

According to an example, the machine learning environment is located on a memory of the apparatus, and/or wherein the plurality of trained machine learning models are located on a memory of the apparatus.

In an example, each trained machine learning algorithm was trained on the basis of a plurality of training industrial monitoring data and associated ground truth information.

In an example, the plurality of training industrial monitoring data and associated ground truth information was for the device or type of device associated with the trained machine learning algorithm.

In an example, the ground truth information was for the device or type of device associated with the trained machine learning algorithm.

In an example, the ground truth information associated with the plurality of training industrial monitoring data comprised associated health score information for the device or type of device associated with specific training industrial monitoring data.

The new industrial data monitoring apparatus and associated method are explained in more detailed below, where reference is made to the "docker" platform that is generally utilized for the implementation of machine learning (ML) models. When docker is invoked it utilizes images and containers. An image is a template with instructions for creating a docker container. A container is a runnable instance of an image.

Thus, traditionally the deployment of ML models is usually facilitated through containers, with as discussed above the most adopted framework for containers today being "docker". In practice, this means that there are either:

N docker images (one per ML model); or 1 docker image (with all individual models inside).

Furthermore, the ML models need to be re-trained with new data on a regular basis. Depending on the specific system context it might also be required to re-train in case the device's task changes.

The above mentioned traditional solution works well if the number of devices (i.e. individual ML models) is small. If, however, there are a lot of devices (e.g. N=5000) that each require an individually trained ML model, then several problems arise:

1. N docker images occupy a lot of space and their creation (e.g. when re-training the ML model) takes a lot of time. In a cloud environment, this results in high costs;
2. If 1 docker image holds N trained ML models, then:
   a. The whole docker image needs to be re-created if only one ML model needs to be re-trained→inefficient, not very flexible and is likely to result in frequent docker image re-creations and high costs;
   b. Creation of the docker image is likely to require a lot of time since each trained ML model needs to be fetched from the model registry and put into a pipeline.

Current solutions in ML model deployment work well in a small-scale setting, however these are likely to run into problems when scaling up.

The new industrial data monitoring apparatus and associated method mitigates these problems.

The following section first explains the new industrial data monitoring apparatus and associated method in principle, where reference is made to FIG. 1, and then in practice, applied to ABB Ability™ Platform, where reference is made to FIG. 2.

Referring to FIG. 1, the new industrial data monitoring apparatus and associated method provide a Flexible Multi-Model Machine Learning Deployment at Scale that is a ML solution design that enables business lines to train and deploy ML models at a large scale and in complex systems—both on cloud and edge. Trained ML models are stored outside of the docker image where they later-on are run. The docker image itself contains a script that leaves a placeholder for the trained ML model, which is filled during runtime. The "runtime" describes the actual use of the ML model when generating e.g. the health score of a device based on its most recent data. At this point in time the docker image expects two inputs (trained ML model, device data to generate health score from) and returns one output (device health score). The output can then be written into a suitable storage from where client applications (e.g. web-based maintenance dashboard) can consume it.

Referring to FIG. 2, the new industrial data monitoring apparatus and associated method are described with respect to the ABB Ability™ Platform. In its capacity as an IIoT platform it provides ideal conditions to apply this concept: it enables to connect to physical devices, model their relationships using the ABB Ability™ Platform Information Model database as well as the necessary components to store containers (registry), results (storage) and runtime (Kubernetes based). In the Information Model, every physical device has a virtual representation in its "Object Model", that captures the its state in properties and variables. The Runtime can execute "Functions" which define input/output and refer to the required docker container.

The implementation works as follows:

1. Individual instances (N) of the ML model are trained for each device using the analytics environment (Databricks)
2. The individually trained ML models (N) are pushed into each device's Object Model (inside of ABB Ability™ Platform Information Model)
3. The Scoring Script expects the following input (JSON payload):
   The trained ML model file (from device's Object Model)
   The (new) data to score (from Platform Telemetry Ingestion)
4. There is one containerized Scoring Function pushed into ABB Ability™ Platform Container Registry
5. Every device is mapped to the same Scoring Function Definition, which uses the device's individually trained ML model
6. Scoring results (e.g. health score) are written into storage via the Telemetry Ingestion Inside of ABB Ability™ Platform the ML model serving can be configured based on customer needs. For example, the ML model can be run:

for all devices on a fixed schedule (e.g. every hour);

for some devices at a different schedule than the rest (e.g. every 30 minutes);

whenever new data arrives for a device; or in many more combinations.

The same applies to re-training the ML model (Databricks). This means for example, that some devices' ML model can be re-trained every day while others are re-trained only once a month, while the dockerized Scoring Function doesn't need to be changed. Subsequently, compute resources are only used (and paid for) when needed.

The new industrial data monitoring apparatus and associated method. In principle and in detailed specific embodiments, provide the following aspects:

Paradigm Shift: An individually trained ML Model becomes part of a device's digital identity instead of it being a compromising somewhat best fit for all devices.

Modular deployment approach: ML model and runtime (docker image) are decoupled, which results in high flexibility and scalability. One docker image can be the runtime for thousands of models.

Edge compatibility: This approach can be run both in the cloud as well as in scenarios where a permanent connection to internet is not always given ("offline edge"). In practice, the trained ML model can be kept close to where it is executed (i.e. docker image on edge device).

Flexible docker image creation: The docker image can handle the flexible multi-model ML deployment approach and its scoring endpoint accepts the trained ML model as an input.

Flexible orchestration of individually trained ML models: In an exemplary embodiment, a subset of devices can have their ML models re-trained at a higher frequency than the rest without the need to re-create the docker image where ML model execution takes place.

Fast ML model re-training/re-deployment: There is no need to create a new docker image, so it's enough to (re-)train the ML model and directly push it into the device's properties.

Cost saving: Container registry consumption is drastically reduced since only 1 (instead of N) container required.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In an example, the processing unit is configured to access and implement a data score algorithm or function. The data score algorithm or function is configured to process the analysis of the industrial monitor data received from the processing unit for the particular device of the plurality of devices to determine the analysis result.

In an example, the analysis result comprises a health score of the particular device of the plurality of devices.

In an example, each device of the plurality of devices has an associated object model, and the trained machine learning model for that device is comprised within the object model for that device.

In an example, the machine learning environment is located on a data storage of the apparatus.

In an example, the machine learning environment is located on a memory of the apparatus.

In an example, the plurality of trained machine learning models are located on a data storage of the apparatus.

In an example, the plurality of trained machine learning models are located on a memory of the apparatus.

Thus, ML environment can comprise a data storage that hosts the model and computing and memory capacities that facilitate the execution of the ML model.

In an example, each trained machine learning algorithm was trained on the basis of a plurality of training industrial monitoring data and associated ground truth information.

In an example, the plurality of training industrial monitoring data and associated ground truth information was for the device or type of device associated with the trained machine learning algorithm.

In an example, the ground truth information was for the device or type of device associated with the trained machine learning algorithm.

In an example, the ground truth information associated with the plurality of training industrial monitoring data comprised associated health score information for the device or type of device associated with specific training industrial monitoring data.

In a second aspect, there is provided a method of industrial data monitoring, comprising:

receiving by an input unit receive industrial monitor data from a particular device of a plurality of devices;

accessing by a processing unit a machine learning environment;

accessing by the processing unit a trained machine learning model for the particular device from a plurality of trained machine learning algorithms, wherein the plurality of trained machine learning models each correspond to a different device of the plurality of devices, and wherein the plurality of trained machine learning models are separate to the machine learning environment;

implementing by the processing unit the machine learning environment and running the trained machine learning model for the particular device to analyze the industrial monitor data received from the particular device of the plurality of devices; and outputting by an output unit an analysis result associated with the analysis of industrial monitor data received from the particular device of the plurality of devices.

In an example, the method comprises accessing and implementing by the processing unit a data score algorithm or function, and processing with the data score algorithm or function the analysis of the industrial monitor data received from the processing unit for the particular device of the plurality of devices to determine the analysis result.

In an example, the analysis result comprises a health score of the particular device of the plurality of devices.

In an example, each device of the plurality of devices has an associated object model, and wherein the trained machine learning model for that device is comprised within the object model for that device.

In an example, the machine learning environment is located on a data storage of the apparatus.

In an example, the machine learning environment is located on a memory of the apparatus.

In an example, the plurality of trained machine learning models are located on a data storage of the apparatus.

In an example, the plurality of trained machine learning models are located on a memory of the apparatus.

The above aspects and examples will become apparent from and be elucidated with reference to the embodiments described hereinafter.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An industrial data monitoring apparatus, comprising:

an input unit;

a processing unit; and an output unit;

wherein, the input unit is configured to receive industrial monitor data from a plurality of devices, each of the plurality of devices having an associated object model comprising a trained machine learning model for that device, each of the trained machine learning models being associated with a different device of the plurality of devices;

wherein, the processing unit is configured to access a machine learning environment;

wherein, the processing unit is configured to access the trained machine learning models of the object models of the plurality of devices via a docker image, wherein the docker image includes a scoring script usable to analyze industrial monitor data of any one of the plurality of devices, the scoring script having a placeholder for a particular trained machine learning model for a particular device of the plurality of devices, wherein the placeholder is filled by the particular trained machine learning model during runtime by accessing the particular trained machine learning model stored external to the docker image within the associated object model of the particular device, wherein at runtime the docker image receives as inputs the industrial monitor data associated with the particular device of the plurality of devices and the externally stored, particular trained machine learning model of the object model associated with the particular device to fill the placeholder, wherein the plurality of trained machine learning models are separate from the machine learning environment, wherein each trained machine learning algorithm was trained on the basis of a plurality of training industrial monitoring data and associated ground truth information, wherein the plurality of training industrial monitoring data and associated ground truth information was for the device or type of device associated with the trained machine learning algorithm, wherein the ground truth information was for the device or type of device associated with the trained machine learning algorithm, and wherein the ground truth information associated with the plurality of training industrial monitoring data comprised associated health score information for the device or type of device associated with specific training industrial monitoring data;

wherein, with respect to industrial monitor data expected to be received from the particular device of the plurality of devices, the apparatus is configured to implement the machine learning environment and run the trained machine learning model comprised within the object model for the particular device to analyze industrial monitor data received from the particular device of the plurality of devices; and wherein, the output unit is configured to output an analysis result associated with the analysis of industrial monitor data received from the particular device of the plurality of devices, and wherein the analysis result comprises a health score of the particular device of the plurality of devices.

2. The industrial data monitoring apparatus according to claim 1, wherein the processing unit is configured to access and implement a data score algorithm or function, and wherein the data score algorithm or function is configured to process the analysis of the industrial monitor data received from the processing unit for the particular device of the plurality of devices to determine the analysis result.

3. The industrial data monitoring apparatus according to claim 1, wherein the machine learning environment is located on a data storage of the apparatus.

4. The industrial data monitoring apparatus according to claim 1, wherein the plurality of trained machine learning models is located on a data storage of the apparatus.

5. A method of industrial data monitoring, comprising:

receiving by an input unit industrial monitor data from a particular device of a plurality of devices, each of the plurality of devices having an associated object model comprising a trained machine learning model for that device, each of the trained machine learning models being associated with a different device of the plurality of devices;

accessing by a processing unit a machine learning environment;

accessing by the processing unit a particular trained machine learning model from the object model associated with the particular device of the plurality of devices via a docker image, wherein the docker image includes a scoring script usable to analyze the industrial monitor data of any one of the plurality of devices, the scoring script having a placeholder for the particular trained machine learning model for the particular device, wherein the placeholder is filled by the particular trained machine learning model during runtime by accessing the particular trained machine learning model stored external to the docker image within the associated object model of the particular device, wherein at runtime the docker image receives as inputs the industrial monitor data of the particular device and the externally stored, particular trained machine learning model of the object model associated with the particular device to fill the placeholder, and wherein the plurality of trained machine learning models are separate from the machine learning environment, wherein each trained machine learning algorithm was trained on the basis of a plurality of training industrial monitoring data and associated ground truth information, wherein the plurality of training industrial monitoring data and associated ground truth information was for the device or type of device associated with the trained machine learning algorithm, wherein the ground truth information was for the device or type of device associated with the trained machine learning algorithm, and wherein the ground truth information associated with the plurality of training industrial monitoring data comprised associated health score information for the device or type of device associated with specific training industrial monitoring data;

implementing by the processing unit the machine learning environment and running the particular trained machine learning model for the particular device to analyze the industrial monitor data received from the particular device of the plurality of devices; and outputting by an output unit an analysis result associated with the analysis of industrial monitor data received from the particular device of the plurality of devices, wherein the analysis result comprises a health score of the particular device of the plurality of devices.

6. The method according to claim 5, wherein the method comprises accessing and implementing by the processing unit a data score algorithm or function, and processing with the data score algorithm or function the analysis of the industrial monitor data received from the processing unit for the particular device of the plurality of devices to determine the analysis result.

7. The method according to claim 5, wherein the machine learning environment is located on a memory of an industrial data monitoring apparatus comprising the processing unit, and/or wherein the plurality of trained machine learning models are located on a memory of the apparatus.

* * * * *